(12) United States Patent
Cantrell et al.

(10) Patent No.: US 11,004,345 B2
(45) Date of Patent: May 11, 2021

(54) SYSTEMS AND METHODS FOR GENERATING AND MONITORING FLIGHT ROUTES AND BUFFER ZONES FOR UNMANNED AERIAL VEHICLES

(71) Applicant: Walmart Apollo, LLC, Bentonville, AR (US)

(72) Inventors: Robert L. Cantrell, Herndon, VA (US); Donald R. High, Noel, MO (US); Samantha M. Mangosing, Bella Vista, AR (US); David C. Winkle, Bella Vista, AR (US); John J. O'Brien, Bella Vista, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 16/506,716

(22) Filed: Jul. 9, 2019

(65) Prior Publication Data

US 2020/0043350 A1    Feb. 6, 2020

Related U.S. Application Data

(60) Provisional application No. 62/712,408, filed on Jul. 31, 2018.

(51) Int. Cl.
*G08G 5/00* (2006.01)
*G08G 5/04* (2006.01)
*B64C 39/02* (2006.01)

(52) U.S. Cl.
CPC ......... *G08G 5/0034* (2013.01); *B64C 39/024* (2013.01); *G08G 5/006* (2013.01);
(Continued)

(58) Field of Classification Search
None
See application file for complete search history.

(56) References Cited

U.S. PATENT DOCUMENTS

| 7,343,232 B2 | 3/2008 | Duggan |
| 7,974,738 B2 | 7/2011 | Bruemmer |

(Continued)

FOREIGN PATENT DOCUMENTS

| KR | 101700535 | 1/2017 |
| WO | 2017096547 | 6/2017 |

OTHER PUBLICATIONS

PCT; App. No. PCT/US2019/042396; International Search Report and Written Opinion dated Oct. 2, 2019.

*Primary Examiner* — Peter D Nolan
*Assistant Examiner* — Ce Li Li
(74) *Attorney, Agent, or Firm* — Fitch, Even, Tabin & Flannery, LLP

(57) ABSTRACT

In some embodiments, methods and systems are provided that provide for creating and monitoring predefined mission routes along air rails and non-overlapping buffer zones surrounding unmanned vehicles during travel of the unmanned vehicles along the predefined mission routes. The buffer zone may be thought of as a projected movement variation area being associated by the system to the UAV and containing four dimensions, the three positional dimensions, X, Y, and Z, along with a temporal one, time. Generally, the buffer zone will change as ambient conditions, location, and orientation of an unmanned vehicle change during travel of the unmanned vehicle along its predefined mission route.

18 Claims, 4 Drawing Sheets

(52) U.S. Cl.
CPC ........... *G08G 5/0069* (2013.01); *G08G 5/045* (2013.01); *B64C 2201/128* (2013.01); *B64C 2201/146* (2013.01)

(56) References Cited

U.S. PATENT DOCUMENTS

| | | | |
|---|---|---|---|
| 9,102,406 B2* | 8/2015 | Stark | G05D 1/0027 |
| 2007/0078600 A1* | 4/2007 | Fregene | G08G 5/0021 |
| | | | 701/301 |
| 2014/0018979 A1 | 1/2014 | Goossen | |
| 2014/0166817 A1* | 6/2014 | Levien | B64C 39/024 |
| | | | 244/190 |
| 2014/0249692 A1* | 9/2014 | Levien | B64C 39/024 |
| | | | 701/2 |
| 2014/0303884 A1* | 10/2014 | Levien | G05D 1/0088 |
| | | | 701/301 |
| 2015/0142211 A1 | 5/2015 | Shehata | |
| 2016/0054737 A1 | 2/2016 | Soll | |
| 2016/0117853 A1 | 4/2016 | Zhong | |
| 2016/0328979 A1* | 11/2016 | Postrel | B64C 39/024 |
| 2017/0025023 A1 | 1/2017 | Goddemeier | |
| 2017/0039764 A1 | 2/2017 | Hu | |
| 2018/0033317 A1* | 2/2018 | Lau | G01S 5/0036 |
| 2019/0101934 A1* | 4/2019 | Tuukkanen | G01C 21/20 |

* cited by examiner

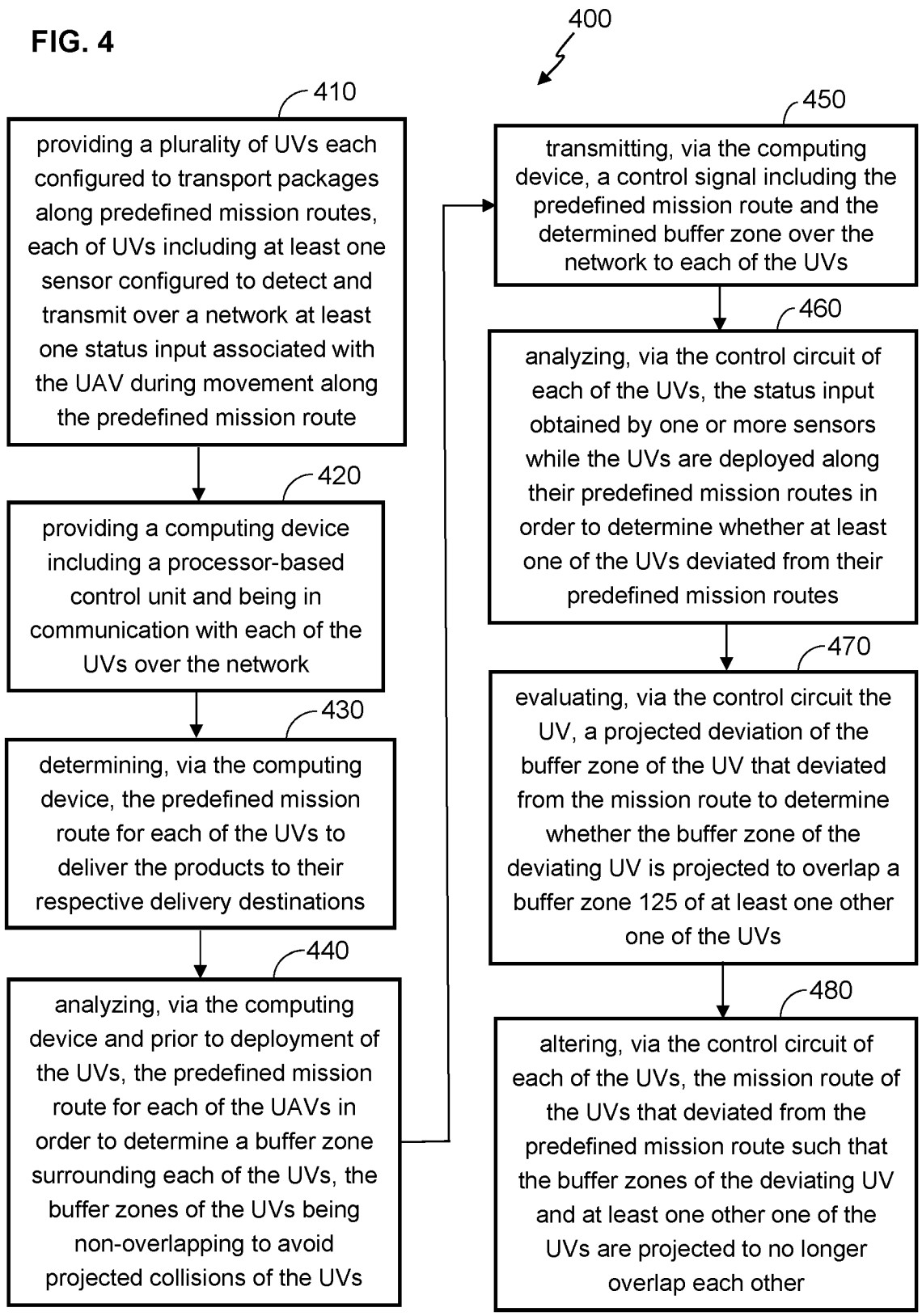

SYSTEMS AND METHODS FOR GENERATING AND MONITORING FLIGHT ROUTES AND BUFFER ZONES FOR UNMANNED AERIAL VEHICLES

CROSS-REFERENCE TO RELATED APPLICATION

This application claims the benefit of U.S. Provisional Application No. 62/712,408, filed Jul. 31, 2018, which is incorporated herein by reference in its entirety.

TECHNICAL FIELD

This disclosure relates generally to determining flight routes for unmanned delivery vehicles and, in particular, to generating flight routes and buffer zones for unmanned delivery vehicles in connection with their travel to and from delivery destinations.

BACKGROUND

When designing systems for transporting products via unmanned aerial vehicles (UAVs), it is conventional to determine a travel path for the UAVs based on the starting point (e.g., deployment station) and the end point (e.g., delivery destination). In view of the possibility that, in the not too distant future, hundreds, if not thousands of UAVs may be flying to their respective destinations in close proximity to each other over densely populated areas (e.g., a city), it will become very important to define the flight routes with an eye toward reducing the chances of collision between the UAV's in the event of unexpected flight route deviations (e.g., caused by UAV mechanical or electrical failure, inclement weather elements, communication/GPS failure, etc.) by one or more of the UAVs traveling in proximity to one another.

BRIEF DESCRIPTION OF THE DRAWINGS

Disclosed herein are embodiments of systems, apparatuses, and methods pertaining to creating and monitoring predefined mission routes and buffer zones for unmanned vehicles during travel of the unmanned vehicles along the predefined mission routes. This description includes drawings, wherein:

FIG. 4 is a flow chart diagram of a process of creating and monitoring predefined mission routes and buffer zones for unmanned vehicles during travel of the unmanned vehicles along the predefined mission routes in accordance with some embodiments.

Figure 1:
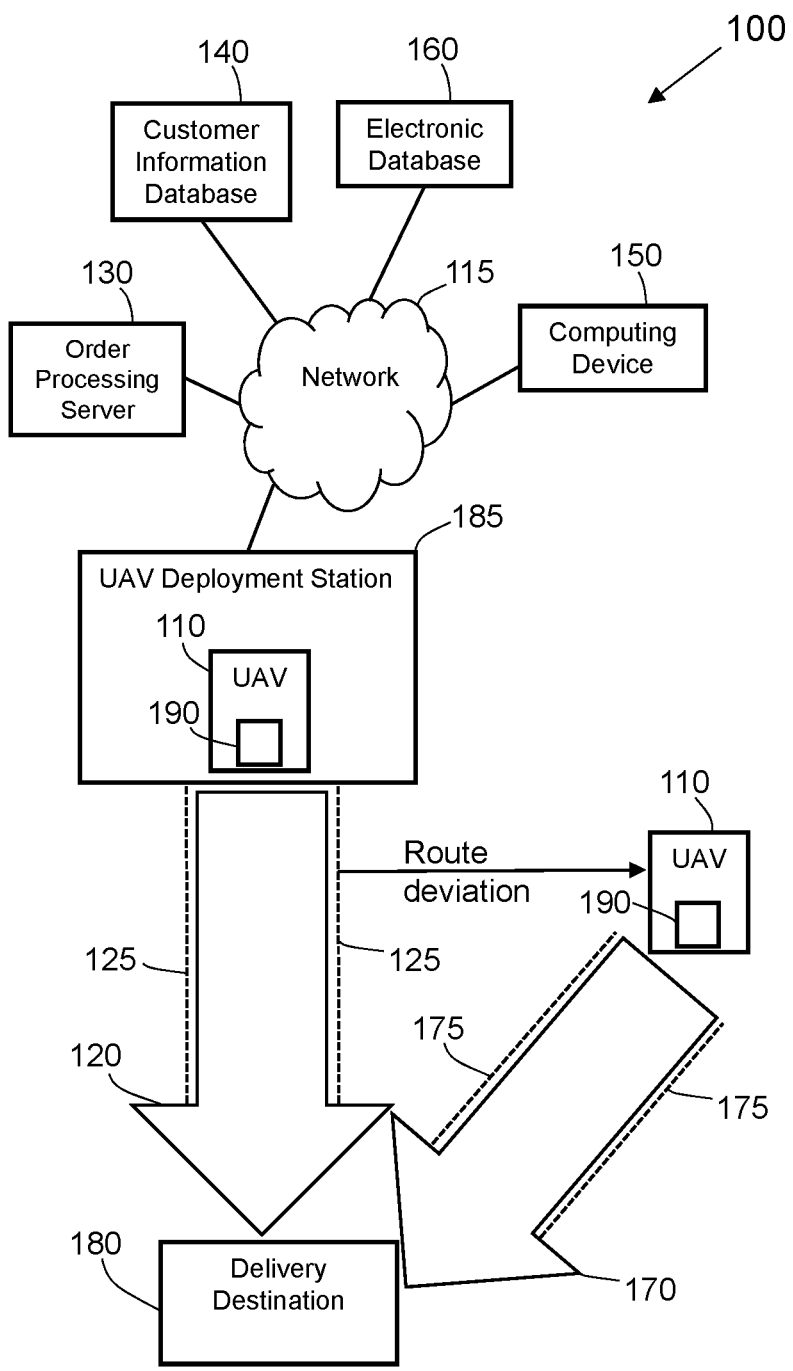
FIG. 1 is a diagram of a system for creating and monitoring predefined mission routes and buffer zones for unmanned vehicles during travel of the unmanned vehicles along the predefined mission routes in accordance with some embodiments.

Elements in the figures are illustrated for simplicity and clarity and have not been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Generally speaking, pursuant to various embodiments, systems, apparatuses, and methods are provided for creating and monitoring predefined mission routes along air rails and non-overlapping buffer zones for unmanned vehicles during travel of the unmanned vehicles along the predefined mission routes. The air rails may be thought of as virtual highways in the sky, and the buffer zone may be thought of as a projected movement variation area being associated by the system to the UAV and containing four dimensions, the three positional dimensions, X, Y, and Z, along with a temporal one, time. Generally, the buffer zone will change as ambient conditions, location, and orientation of an unmanned vehicle change during travel of the unmanned vehicle along its predefined mission route.

In some aspects, while the unmanned vehicles are deployed along their predefined mission routes, the systems and methods herein analyze the status input of such unmanned vehicles to determine whether any of the unmanned vehicles have deviated or are about to deviate from their predefined mission routes, evaluate a projected deviation of the buffer zone of such unmanned vehicles, and determine whether the buffer zone of the unmanned vehicles that deviated from the predefined mission route is projected to overlap a buffer zone of one or more other unmanned vehicles. In the event of a projected buffer zone overlap, the systems and methods herein alter the mission route of the unmanned vehicles that have deviated (or are projected to deviate) from the predefined mission route such that the buffer zones of the unmanned vehicles that deviated from the predefined mission route and other unmanned vehicles are projected to not overlap each other.

FIG. 1 shows an embodiment of a system 100 for creating and monitoring predefined mission routes 120 and buffer zones 125 for unmanned vehicles 110 during travel of the unmanned vehicles 110 along the predefined mission routes 120. It will be understood that the details of this example are intended to serve in an illustrative capacity and are not necessarily intended to suggest any limitations in regard to the present teachings. In some aspects, the exemplary UAV 110 of FIG. 1 is configured to transport one or more products 190 from one or more UAV deployment stations 185 to one or more delivery destinations 180 via the exemplary flight route or mission route 120. In other aspects, the UAV 110 is configured to fly along the mission route 120 from a UAV deployment station 185 to a product pick up location. In yet other aspects, the UAV 110 is configured to fly along the mission route 120 from a delivery destination 180 or a product pick up location back to the UAV deployment station 185. Notably, while the mission route 120 is illustrated in FIG. 1 as a straight line for ease for reference, it will be appreciated that the mission route 120 for a given UAV 110 may be composed of one or more straight lines and curved lines, and may change direction of travel one or more times.

A customer may be an individual or business entity. A delivery destination 180 may be a home, workplace, or another location designated by the customer when placing the order. Exemplary products 190 that may be ordered by the customer via the system 100 may include, but are not limited to, general-purpose consumer goods (retail products and goods not for sale) and consumable products (e.g., food items, medications, or the like). A UAV deployment station 185 can be mobile (e.g., vehicle-mounted) or stationary (e.g., installed at a facility of a retailer). A retailer may be any entity operating as a brick-and-mortar physical location and/or a website accessible, for example, via an intranet, internet, or another network, by way of which products 190 may be ordered by a consumer for delivery via a UAV 110.

The exemplary system 100 depicted in FIG. 1 includes an order processing server 130 configured to process a purchase order by a customer for one or more products 190. It will be appreciated that the order processing server 130 is an optional component of the system 100, and that some embodiments of the system 100 are implemented without incorporating the order processing server 130. The order processing server 130 may be implemented as one server at one location, or as multiple interconnected servers stored at multiple locations operated by the retailer, or for the retailer. As described in more detail below, the order processing server 130 may communicate with one or more electronic devices of system 100 via a network 115. The network 115 may be a wide-area network (WAN), a local area network (LAN), a personal area network (PAN), a wireless local area network (WLAN), Wi-Fi, Zigbee, Bluetooth, or any other internet or intranet network, or combinations of such networks. Generally, communication between various electronic devices of system 100 may take place over hardwired, cellular, Wi-Fi or Bluetooth networked components or the like. In some embodiments, one or more electronic devices of system 100 may include cloud-based features, such as cloud-based memory storage.

In the embodiment of FIG. 1, the order processing server 130 communicates with a customer information database 140. In some embodiments, the customer information database 140 may be configured to store information associated with customers of the retailer who order products 190 from the retailer. In some embodiments, the customer information database 140 may store electronic information including but not limited to: personal information of the customers, including payment method information, billing address, previous delivery addresses, phone number, product order history, pending order status, product order options, as well as product delivery options (e.g., delivery by UAV) of the customer. The customer information database 140 may be stored, for example, on non-volatile storage media (e.g., a hard drive, flash drive, or removable optical disk) internal or external to the order processing server 130, or internal or external to computing devices separate and distinct from the order processing server 130. It will be appreciated that the customer information database 140 may likewise be cloud-based.

In the embodiment of FIG. 1, the order processing server 130 is in communication with an electronic database 160 configured to store information associated with the inventory of products 190 made available by the retailer to the customer, as well as information associated with the UAVs 110 being deployed to deliver products 190 to the delivery destinations 180 specified by the customers. In some aspects, the electronic database 160 stores information including but not limited to: information associated with the products 190 being transported by the UAV 110; inventory (e.g., on-hand, sold, replenishment, etc.) information associated with the products 190; flight status information associated with the UAV 110; information associated with predetermined original mission routes 120 of the UAV 110; information associated with predetermined buffer zones 125 for the mission routes 120 of the UAV 110; status input information detected by one or more sensors of the UAV 110 during flight of the UAV 110 along the predetermined original mission route 120; information indicating projected deviations of the UAV 110 from the predetermined mission route 120; information indicating actual deviations of the UAV 110 from the predetermined mission route 120; information indicating an updated mission route 120 of the UAV 110 that deviated from its original predetermined mission route 120; and information including an updated buffer zone 125 corresponding to the updated mission route 120.

The electronic database 160 may be stored, for example, on non-volatile storage media (e.g., a hard drive, flash drive, or removable optical disk) internal or external to the order processing server 130, or internal or external to computing devices separate and distinct from the order processing server 130. The electronic database 160 may likewise be cloud-based. While the customer information database 140 and the electronic database 160 are shown in FIG. 1 as two separate databases, it will be appreciated that the customer information database 140 and the electronic database 160 can be incorporated into one database.

With reference to FIG. 1, the computing device 150 may be a stationary or portable electronic device, for example, a desktop computer, a laptop computer, a tablet, a mobile phone, or any other electronic device including a processor-based control circuit (i.e., control unit). For purposes of this specification, the term "computing device 150" will be understood to refer to a computing device owned by the retailer or any computing device owned and/or operated by an entity (e.g., delivery service) having an obligation to deliver products 190 for the retailer. In the embodiment of FIG. 1, the computing device 150 is configured for data entry and processing as well as for communication with other devices of system 100 via the network 115 which, as described above. In some embodiments, as will be described below, the computing device 150 is configured to access the electronic database 160 and/or customer information database 140 via the network 115 to facilitate delivery of products 190 via UAVs 110 along predefined mission routes 120 and within predefined buffer zones 125 to their respective delivery destinations 180.

In the system 100 of FIG. 1, the computing device 150 is in two-way communication with the UAV 110 via the network 115. For example, the computing device 150 can be configured to transmit at least one signal to the UAV 110 to cause the UAV 110 to fly along a mission route 120 determined by the computing device 150 and/or to deviate from a predetermined mission route 120 while transporting products 190 from the UAV deployment station 185 to the intended delivery destination 180 (e.g., to drop off a product 190 or to pick up a product 190), or while returning from the delivery destination 180 to the UAV deployment station 185 (e.g., after dropping off a product 190 or after picking up a product 190).

In some aspects, after a customer places an on order for one or more products 190 and specifies a delivery destination 180 for the products 190 via the order processing server 130, prior to and/or after the commencement of a delivery attempt of the products 190 ordered by the customer via a UAV 110 to the delivery destination 180, the computing device 150 is configured to obtain GPS coordinates associated with the delivery destination 180 selected by the customer and GPS coordinates associated with the UAV deployment station 185 of the retailer (which houses the UAV 110 that will deliver the products 190), and determine a mission route 120 for the UAV 110 in order to deliver the customer-ordered products 190 from the UAV deployment station 185 to the delivery destination 180.

Figure 3:
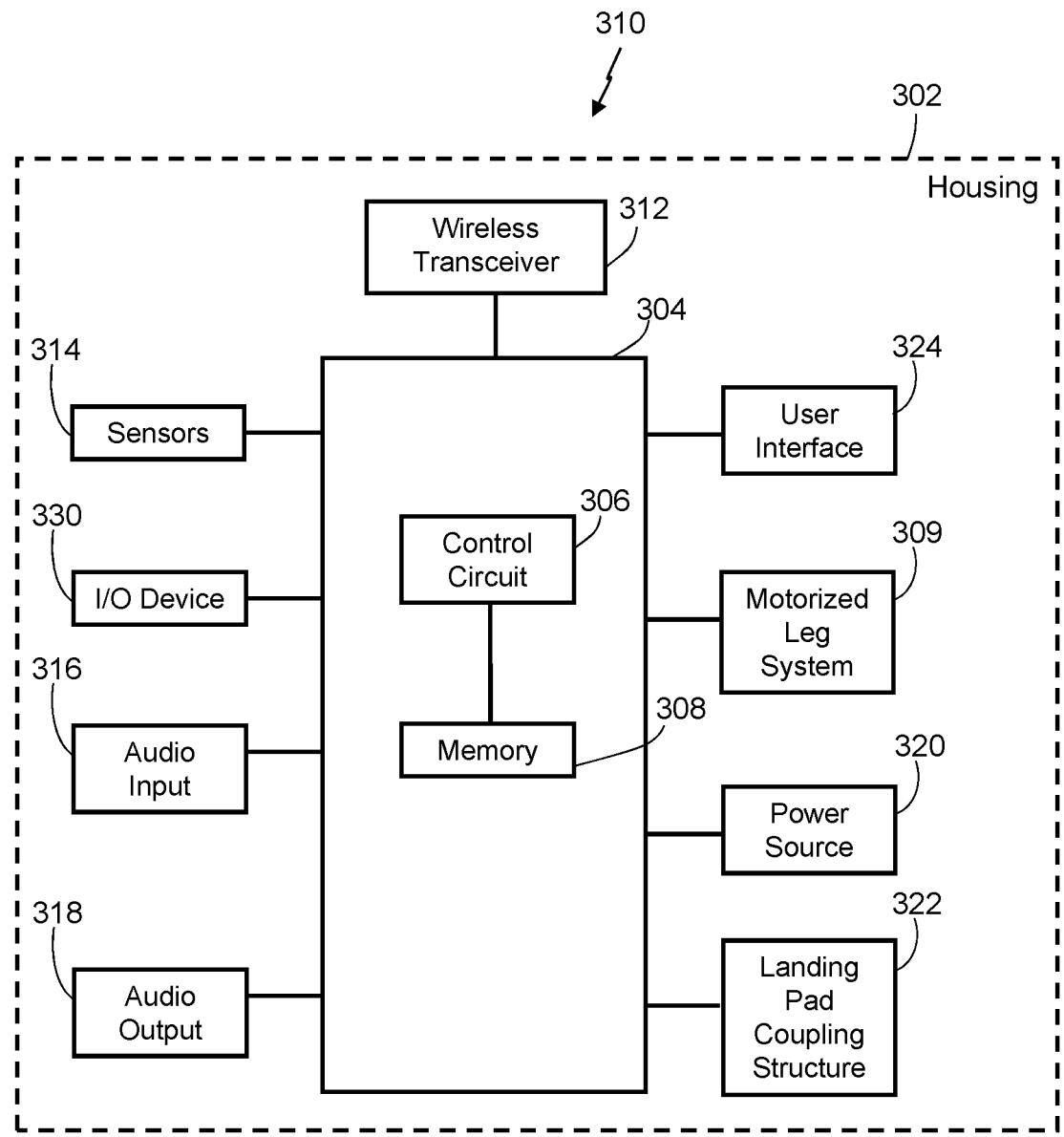
FIG. 3 comprises a block diagram of an unmanned aerial vehicle as configured in accordance with some embodiments.

The UAV 110, which will be discussed in more detail below with reference to FIG. 3, is generally an unmanned aerial vehicle configured to autonomously traverse one or more intended environments in accordance with one or more mission routes 120 and buffer zones 125 determined by the computing device 150, and typically without the intervention of a human or a remote computing device, while retaining the products 190 therein and delivering the products 190 to the delivery destination 180. In some instances, however, a remote operator or a remote computer (e.g., computing device 150) may temporarily or permanently take over operation of the UAV 110 using feedback information (e.g., audio and/or video content, sensor information, etc.) communicated from the UAV 110 to the remote operator or computer via the network 115, or another similar distributed network. While only one UAV 110 is shown in FIG. 1 for ease of illustration, it will be appreciated that in some embodiments, the computing device 150 may communicate with, and/or provide mission route instructions to more than one (e.g., 5, 10, 20, 50, 100, 1000, or more) UAV 110, simultaneously guiding and/or monitoring the movement of one or more UAVs 110 while the UAVs 110 are transporting products 190 to their respective delivery destinations 180.

Figure 2:
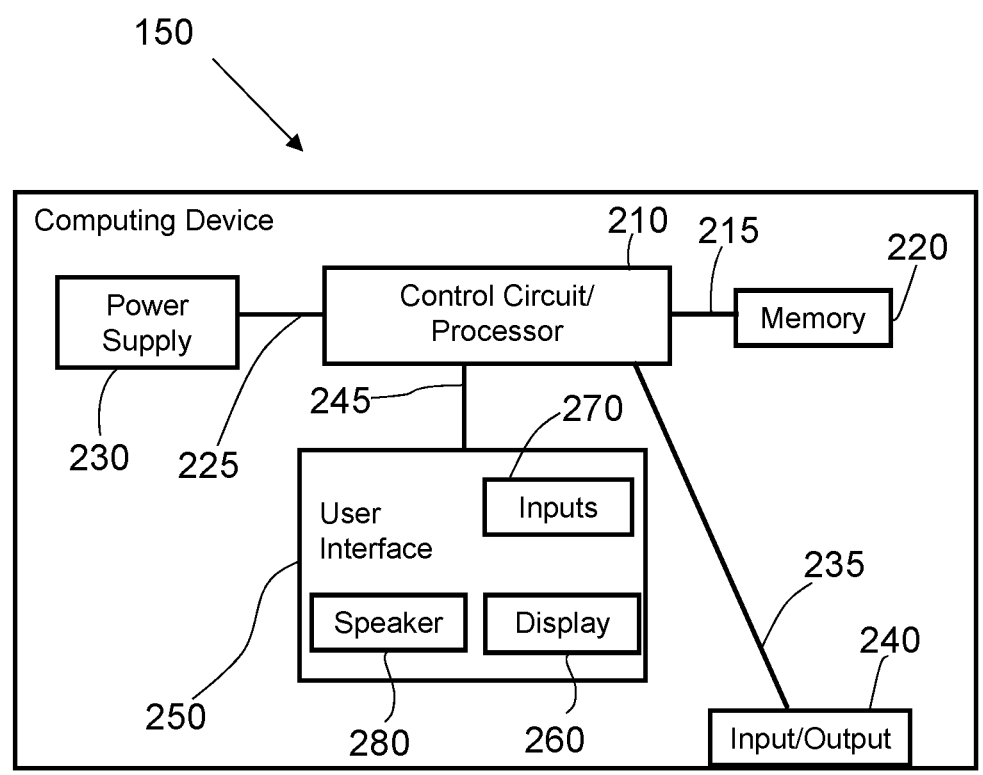
FIG. 2 is a functional diagram of an exemplary computing device usable with the system of FIG. 1 in accordance with some embodiments.

With reference to FIG. 2, an exemplary computing device 150 configured for use with the systems and methods described herein may include a control unit or control circuit 210 including a processor (for example, a microprocessor or a microcontroller) electrically coupled via a connection 215 to a memory 220 and via a connection 225 to a power supply 230. The control circuit 210 can comprise a fixed-purpose hard-wired platform or can comprise a partially or wholly programmable platform, such as a microcontroller, an application specification integrated circuit, a field programmable gate array, and so on. These architectural options are well known and understood in the art and require no further description here.

The control circuit 210 of the computing device 150 can be configured (for example, by using corresponding programming stored in the memory 220 as will be well understood by those skilled in the art) to carry out one or more of the steps, actions, and/or functions described herein. In some embodiments, the memory 220 may be integral to the processor-based control circuit 210 or can be physically discrete (in whole or in part) from the control circuit 210 and is configured non-transitorily store the computer instructions that, when executed by the control circuit 210, cause the control circuit 210 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM)) as well as volatile memory (such as an erasable programmable read-only memory (EPROM))). Thus, the memory and/or the control circuit may be referred to as a non-transitory medium or non-transitory computer readable medium.

In some embodiments, the system 100 includes one or more localized Internet-of-Things (IoT) devices and controllers in communication with the computing device 150. As a result, in some embodiments, the localized IoT devices and controllers can perform most, if not all, of the computational load and associated monitoring that would otherwise be performed by the computing device 150, and then later asynchronous uploading of summary data can be performed by a designated one of the IoT devices to the computing device 150, or a server remote to the computing device 150. In this manner, the computational effort of the overall system 100 may be reduced significantly. For example, whenever a localized monitoring allows remote transmission, secondary utilization of controllers keeps securing data for other IoT devices and permits periodic asynchronous uploading of the summary data to the computing device 150 or a server remote to the computing device 150. In addition, in an exemplary embodiment, the periodic asynchronous uploading of summary data may include a key kernel index summary of the data as created under nominal conditions. In an exemplary embodiment, the kernel encodes relatively recently acquired intermittent data ("KRI"). As a result, in an exemplary embodiment, KM includes a continuously utilized near term source of data, but KM may be discarded depending upon the degree to which such KM has any value based on local processing and evaluation of such KM. In an exemplary embodiment, KM may not even be utilized in any form if it is determined that KM is transient and may be considered as signal noise. Furthermore, in an exemplary embodiment, the kernel rejects generic data ("KRG") by filtering incoming raw data using a stochastic filter that provides a predictive model of one or more future states of the system and can thereby filter out data that is not consistent with the modeled future states which may, for example, reflect generic background data. In an exemplary embodiment, KRG incrementally sequences all future undefined cached kernels of data in order to filter out data that may reflect generic background data. In an exemplary embodiment, KRG incrementally sequences all future undefined cached kernels having encoded asynchronous data in order to filter out data that may reflect generic background data.

With reference to FIG. 2, the control circuit 210 of the exemplary computing device 150 is also electrically coupled via a connection 235 to an input/output 240 that can receive signals from the UAV 110 and/or order processing server 130 and/or customer information database 140 and/or electronic database 160 (e.g., sensor data representing at least one status input associated with the UAV 110 during flight of the UAV 110 along the mission route 120, data relating to an order for a product 190 placed by the customer, location data (e.g., GPS coordinates) associated with the delivery destination 180 selected by the customer, or from any other source (e.g., one or more scouting vehicles tasked with scanning flight conditions (e.g., weather, UAV congestion, visibility, etc.) relevant to determining a mission route 120 and/or buffer zone 125) that can communicate with the computing device 150 via a wired or wireless connection. The input/output 240 of the computing device 150 can also send signals to the UAV 110 (e.g., a first control signal indicating a mission route 120 determined by the computing device 150 for the UAV 110 in order to deliver the product 190 from the UAV deployment station 185 to the delivery destination 180). The input/output 240 of the computing device 150 can also send signals to the order processing server 130 (e.g., notification indicating that the UAV 110 was unable to successfully deliver the product 190 to the delivery destination 180) and/or to the electronic database 160 (e.g., forwarding data indicating the parameters (e.g., dimensions) of the buffer zone 125 calculated for a given mission route 120 for a given UAV 110, sensor data received from the UAV 110, or data indicating an altered mission route 170 and an altered buffer zone 175 after the UAV 110 is rerouted from its original mission route 120, etc. due to an unforeseen (e.g., emergency) condition.

In the embodiment of FIG. 2, the processor-based control circuit 210 of the computing device 150 is electrically coupled via a connection 245 to a user interface 250, which may include a visual display or display screen 260 (e.g., LED screen) and/or button input 270 that provide the user interface 250 with the ability to permit an operator of the computing device 150 to manually control the computing device 150 by inputting commands via touch-screen and/or button operation and/or voice commands to, for example, to transmit a first control signal to the UAV 110 in order to provide the UAV 110 with the mission route 120 from the UAV deployment station 185 to the delivery destination 180. It will be appreciated that the performance of such functions by the processor-based control circuit 210 of the computing device 150 is not dependent on a human operator, and that the control circuit 210 may be programmed to perform such functions without a human operator.

In some aspects, the display screen 260 of the computing device 150 is configured to display various graphical interface-based menus, options, and/or alerts that may be transmitted to the computing device 150 and displayed on the display screen 260 in connection with various aspects of the delivery of the products 190 ordered by the customers by the UAVs 110, as well as various aspects of predicted and actual movement of the UAV 110 along the predefined mission routes 120 and buffer zones 125. The inputs 270 of the computing device 150 may be configured to permit an operator to navigate through the on-screen menus on the computing device 150 and change and/or update the mission route 120 and/or buffer zone 125 for a UAV 110 due to a predicted and/or unexpected deviation of the UAV 110 from the predefined mission route 120. It will be appreciated that the display screen 260 may be configured as both a display screen and an input 270 (e.g., a touchscreen that permits an operator to press on the display screen 260 to enter text and/or execute commands.)

In some embodiments, after an order for one or more products 190 is placed by a customer via the order processing server 130, and prior to commencement of the delivery attempt of one or more products 190 via the UAV 110 to the delivery destination 180 designated by the customer, the control circuit 210 of the computing device 150 is programmed to obtain the GPS coordinates of the delivery destination 180 where the product 190 is to be delivered by the UAV 110. For example, in embodiments, where the customer requested delivery of a product 190 or products 190 to a delivery destination 180 associated with a specific geographic location (e.g., home address, work address, etc.), the control circuit 210 of the computing device 150 obtains the GPS coordinates associated with the delivery destination 180, for example, from the customer information database 140, or from another source configured to provide GPS coordinates associated with a given physical address.

In some embodiments, the control circuit 210 of the computing device 150 is configured to analyze the GPS coordinates of both the UAV deployment station 185 and the delivery destination 180, and to determine and generate a mission route 120 for the UAV 110. In some aspects, the mission route 120 is akin to a virtual air rail and is defined by coordinates defined on the latitudinal, longitudinal, and vertical plane relative to the ground. In some aspects, as will be discussed in more detail below, the mission route 120 of the UAV 110 is composed of multiple coordinate strings on all three designated planes, which may be detected and/or followed by one or more sensors of the UAV 110 so that the UAV 110 in real time can track where it is relative to the mission route 120, and the mission route 120 along which it is directed to travel. In some embodiments, the mission routes 120 for a multitude of UAVs 110 traveling simultaneously may be layered in vertical and/or horizontal stacks.

In some aspects, the control circuit 210 of the computing device 150 is programmed to generate a mission route 120 for the UAV 110 such that defined (e.g., by block chain or the like) electronic tokens where a UAV 110 must hold the electronic token in order to gain access to and follow the generated mission route 120. In some embodiments, the control circuit 210 of the computing device 150 is programmed, after generating a given mission route 120 for the UAV 110, to indicate the availability (e.g., a specific time frame) of the mission route 120 to the UAV 110. The availability of a predefined mission route 120 to the UAV 110 may be calculated by the control circuit 210 while taking into account, for example, expected traffic/congestion conditions, ambient weather conditions, or other conditions (e.g., battery status/flight range of the UAV 110, etc.) that may affect the speed and/or direction of movement of the UAV 110 along the predetermined mission route 120.

In one aspect, the mission route 120 determined by the computing device 150 is based on a starting location of the UAV 110 (e.g., a UAV deployment station 185) and the intended destination of the UAV 110 (e.g., delivery destination 180 and/or product pick up destination). In some aspects, the computing device 150 is configured to calculate multiple possible mission routes 120 for the UAV 110, and then select a mission route 120 determined by the computing device 150 to provide an optimal flight time. In some embodiments, after the control circuit 210 of the computing device 150 determines and generates a mission route 120 for the UAV 110, the computing device 150 transmits, via the output 240 and over the network 115, a first signal including the mission route 120 to the UAV 110 that was determined by the computing device 150 to be assigned the task of delivering one or more products 190 from the UAV deployment station 185 to the delivery destination 180. In some aspects, the control circuit 210 is programmed to assign a given UAV 110 the task of delivering one or more products 190 from the UAV deployment station 185 to the delivery destination 180 along a predefined mission route 120 only after the control circuit 210 verifies that the UAV 110 satisfies all mission and/or operational and/or size capacities required of the UAV 110 to be assigned the task.

In certain embodiments, the control circuit 210 of the computing device 150 is programmed to generate a multitude of mission routes 120 for multitude of UAVs 110 (e.g., dozens, hundreds, thousands) such that a mesh (e.g., including horizontal and/or vertical stacks) of mission routes 120 is created providing the UAVs 110 with optimal pathways based on the applicable respective distance, ambient conditions, and UAV traffic associated with each one of the mission routes 120 from given UAV deployment stations 185 to given delivery destinations 180. For example, in some aspects, the control circuit 210 of the computing device 150 is programmed to generate and/or select a mission route 120 for a UAV 110 specifically to achieve the fastest flight time from the UAV deployment station 185 to the delivery destination 180.

In some aspects, for example, the control circuit 210 of the computing device 150 is programmed to assign a higher priority to certain mission routes 120 (e.g., for UAVs 110 carrying a cold-chain product 190, a product 190 with a short use by time, a product 190 with a soon-approaching expiration date, etc.) as compared to other mission routes 120 (e.g., for UAVs 110 carrying products 190 that do not have a cold-chain requirement, an approaching expiration date, etc.). In certain implementations, the control circuit 210 is programmed to configure mission routes 120 having a higher priority to have a shorter overall UAV travel distance (e.g., by being composed of one or more straight lines) from the UAV deployment station 185 to the delivery destination 180 than the comparatively lower priority mission routes 120 (which may be composed of more curved lines thus increasing their overall UAV travel distance).

In some aspects, the control circuit 210 of the computing device 150 is programmed to generate multiple mission routes 120 for multiple UAVs 110 such that certain mission routes 120 are designated for certain speed ranges and also have on-ramps and off-ramps (as well as one or more charging stations and/or safe emergency stop and/or product hand-over locations) to maintain optimum throughput. For example, in some implementation, the control circuit 210 is programmed to assign higher travel speed mission routes 120 at a higher altitudes to UAVs 110 that are not carrying products 190, and lower travel speed mission routes 120 at lower altitudes to UAVs 110 that are carrying products 190. In some aspects, the control circuit 210 is programmed to generate one or more roundabouts for each mission route 120 which can, for example, permit a UAV 110 that has dropped off the products 190 at the delivery destination 180 to safely reenter the mission route 120 and return back to the UAV deployment station 185.

The assignment of higher priority to certain mission routes 120 as compared to other mission routes 120 may be applicable to situations, where the product 190 or products 190 to be delivered by the UAV 110 are cold-chain items (e.g., frozen meats, ice-creams, etc.). In certain implementations, when the UAV 110 is assigned by the control circuit 210 of the computing device 150 to transport cold-chain products 190, the control circuit 210 is programmed to determine the mission route 120 based on the projected exposure of the UAV 110 to sunlight and the elements, which will be expected to affect the integrity of the cold chain products 190. In other words, in certain embodiments, the control circuit 210 of the computing device 150 is programmed to generated a mission route 120 in order to limit/reduce the amount of sunlight exposure (e.g., by using cloud coverage, building shadows, etc.) of a product 190 being transported by the UAV 110 assigned to transport a cold-chain product 190 along this mission route 120.

In some aspects, after the mission route 120 for each of the UAVs 110 to be airborne at the same time is determined, and prior to the UAVs 110 being deployed from the UAV deployment station 185 on a delivery mission along the mission route 120 towards the delivery destination 180, the control circuit 210 is programmed to analyze the predetermined mission routes 120 of such UAVs 110 in order to determine a buffer zone 125 suitable to account for the predicted variations in movement of the UAV 110 (e.g., up, down, left, and right) during their flights along their determined respective mission routes 120. In some embodiments, each of the concurrently airborne UAVs 110 is associated by the control circuit 210 of the computing device 150 with a buffer zone 125 that does not overlap any of the buffer zones 125 of the other UAVs 110 in order to avoid projected collisions of the UAVs 110 traveling in proximity to each other.

In some embodiments, the control circuit 210 of the computing device 150 is programmed to determine the buffer zone 125 around a UAV 110 to be flying along a predetermined mission route 120. In certain implementations, the buffer zone 125 is a three dimensional buffer zone (e.g., extending in X, Y, and Z dimensions) that is based at least on one or more of the following variables: communications lag time from UAV 110 to the computing device 150; the handling characteristics of the UAV 110 (e.g., payload weight, payload size, etc.); the speed of the UAV 110; UAV congestion (i.e., traffic) in a given segment of the mission route 120, and weather (e.g., wind speed, wind gust speed, precipitation, air density, visibility, smoke, etc.). In some aspects, an exemplary buffer zone 125 calculated by the control circuit 210 for a UAV 110 depends on the overall size of the UAV 110, and for a UAV 110 shaped as a 1 ft by 1 ft cube, the calculated buffer zone 125 may be, for example, from about 1 feet to about 10 feet (e.g., 1 foot, 3 feet, 6 feet, 8 feet, etc.) in each direction surrounding the mission route 120 of the UAV 110, thus forming a 360° imaginary cylinder surrounding the UAV 110 at any point along the mission route 120 assigned to the UAV 110.

As will be discussed below, in some aspects, the buffer zone 125 can have both a baseline and dynamic dimensions in real time, and emergency conditions may cause the mission route 120 and hence the buffer zone 125 for any given UAV 110 to change during the flight of the UAV 110 along its assigned mission route 120. As pointed out above, the buffer zone 125 may change during the course of movement of the UAV 110 along its predefined mission route 120 in response to various factors (e.g., ambient conditions, inclement weather elements, obstacles, air traffic, mechanical and/or electronic failures, communication/GPS failures, etc.) that may affect the UAV 110 during a flight mission, and one purpose of the buffer zone 125 is to provide extra precalculated room for movement of the UAV 110 without colliding with another nearby UAV 110, thereby reducing the chances of collisions of UAVs 110 that are proximate each other as they are traveling along their respective mission routes 120.

In an exemplary embodiment, after the control circuit 210 of the computing device 150 determines the buffer zone 125, the control circuit 210 is programmed to perform buffer zone assessment calculations in a continuous loop as follows. First, the control circuit 210 assesses the dimensions (e.g., overall size, shape, weight, etc.) of the UAV 110. Second, the control circuit 210 assesses the performance parameters (e.g., speed, agility, stopping, load modifiers, etc.). Then, in some embodiments, the control circuit 210 assesses the buffer profile using UAV energy maneuverability using the following formula: $PS=V((T-D)/W)$, where: PS=Performance at speed; V=Velocity; T=Thrust; D=Drag; W=Weight, such that the buffer zone 125 is calculated by the control circuit 210 to give ample stopping or maneuver room for the UAV 110 to avoid various hazards (e.g., obstacles, other UAVs 110, etc.) along the mission route 120. In some aspects, the control unit 210 is programmed to modify the dimensions of the buffer zone 125 in order to address the drag on the external payload (delivery box) carried by the UAV 110 using drag calculations: $D=Cd*A*0.5*r*V^2$, where D=Drag; Cd=Drag Coefficient; A=Reference area; r=density [or the air in this instance]; and V=velocity.

In some embodiments, the control unit 210 of the computing device 150 is programmed to assess the obstacles and traffic projected to be encountered by the UAV 110 along the mission route 120 and traffic via maps, sensors of the UAV 110, unmanned traffic management (UTM) data, air traffic control (ATC) data, etc. In one aspect, the control unit 210 is programmed to modify the speed of the UAV 110 along the mission route 120 as follows: V=min {a,b}, where a=fastest safe speed, and b=fastest allowed speed. In some implementations, after the control circuit 210 determines the buffer zone 125 and all associated parameters of the buffer zone 125, the control circuit 210 is programmed to communicate the coordinates (i.e., X, Y, Z) of the buffer zone 125 and the velocity of the UAV 110 with UTM and ATC. Then, after the mission of the UAV 110 is finished, the control unit 210 is programmed to shut down the buffer zone 125 associated with the mission route 120 of the UAV 110, and to communicate the shutdown of the buffer zone 125 to the UTM or the ATC.

In certain aspects, in addition to determining the coordinates of a mission route 120 and a buffer zone 125 for a given UAV 110, the control unit 210 is programmed to generate a grid, where the mission routes 120 and buffer zones 125 are safely spaced apart by being separated by altitude or space (e.g., in some aspects, creating a multiple rail system with vertical and horizontal mission route stacks). In certain implementations, the control circuit 210 may be programmed, for example, to: provision a given area with a geo-fence to be used by a single UAV 110; provide a buffer zone 125 to be accompanied with a lane to avoid lane-lane collisions of UAVs 110; provide a scheduling system to allow the UAVs 110 to reserve a lane; allow the UAVs 110 to change lanes depending on their mission routes 120; provision communication pathways to be used throughout the mission routes 120 at different increments; provision and assign different check points throughout the each of the mission routes 120 to maintain the tracking knowledge of the control circuit 210 relative to the UAV 110 as the UAV 110 is moving along its predetermined mission route 120. In some embodiments, the control circuit 210 is programmed to provision recharge stations to be used by the UAVs 110 depending upon the resources usage of the UAV 110 and depending when the control unit 210 anticipates additional future charging throughout the predetermined mission route 120 of the UAV 110. In some embodiments, before the UAV 110 has been deployed along a mission route 120 predetermined by the computing device 150, the control circuit 210 of the computing device 150 is programmed to predict possible conditions that may cause directional variations in the movement of the UAV 110 along the predefined mission route 120, as well as the extent (e.g., a predicted distance in inches or feet) of the directional variation due to the expected condition (e.g., wind gust, UAV congestion, heavy rain, etc.), and to define the boundaries of the buffer zone 125 based on the maximum predicted extent of the directional variations of movement of the UAV 110 in order to decrease the chances that a first UAV 110 would collide with a second UAV 110 if the first UAV 110 were to deviate from the mission route 120 as a result of a weather-related or another condition.

In some embodiments, the control circuit 210 is programmed to generate and/or assign mission routes 120 to UAVs 110 specifically based on the total distance that the UAV 110 would travel from the UAV deployment station 185 to the delivery destination 180. For example, in some embodiments, the control circuit 210 may generate and/or assign mission routes based on distance increments (e.g., 5 miles, 10 miles, 15 miles, 20 miles, 25 miles, etc.), and include one or more rest stops and/or check points and/or recharging stations depending on the total distance. The rest stops may be used, for example, for UAVs 110 that are transporting the products 190 to the delivery destination 180 ahead of schedule, or for UAVs 110 that are encountering very heaving air traffic congestion along their mission route 120. In one aspect, the rest stops and recharging stations are elevated off the ground in order to provide a safe area for the UAVs 110.

In some embodiments, the computing device 150 is capable of integrating 2D and 3D maps of the navigable space of the UAV 110 along the mission route 120 determined by the computing device 150, complete with topography data comprising: no fly zones along the mission route 120 and on-ground buildings, hills, bodies of water, power lines, roads, vehicles, people, and/or known safe landing points for the UAV 110 along the mission route 120. After the computing device 150 maps all in-air and on-ground objects along the mission route 120 of the UAV 110 to specific locations using algorithms, measurements, and GPS geo-location, for example, grids may be applied sectioning off the maps into access ways and blocked sections, enabling the UAV 110 to use such grids for navigation and recognition. The grids may be applied to 2D horizontal maps along with 3D models. Such grids may start at a higher unit level and then can be broken down into smaller units of measure by the computing device 150 when needed to provide more accuracy.

In some embodiments, to save the computing power required of the computing device 150, the control circuit 210 of the computing device 150 is programmed to turn off the buffer zone 125 associated with one or more UAVs 110 for a suitable interval of time (e.g., 5 minutes, 15 minutes, 30 minutes, 1 hour, 2 hours, etc.). For example, in some implementations, the buffer zone 125 located behind a moving UAV 110 may be turned off by the control circuit 210 of the computing device 150 as the UAV 110 is moving forward. However, the control circuit 210 may reactivate the temporarily deactivated buffer zone 125 if the UAV 110 is required to make a sudden stop or a reverse maneuver.

In some embodiments, the system 100 includes optional scout vehicles 155 that can facilitate in the initial determination of the mission route 120 and buffer zone 125 prior to deployment of the UAVs 110. In particular, in one aspect, the system 100 includes one or more scout vehicles 155 that are configured to analyze, prior to the deployment of the UAVs 110, travel conditions along the predefined mission routes 120 for the UAVs 110, and transmit one or more signals over the network 115 to the computing device 150 in order to notify the computing device 150 of the predicted travel conditions analyzed by the scout vehicle(s) 155. In response to receipt of such a signal or signals from the scout vehicles 155, in some embodiments, the control circuit 210 of the computing device 150 is programmed to determine the buffer zone 125 for each of the UAVs 110 based at least in part on the signal received from one or more of the scout vehicles 155. Notably, in some aspects, after the UAVs 110 are deployed along their predefined mission routes 120 toward their intended delivery destinations 180, one or more scout vehicles 155 are configured to monitor (e.g., by utilizing a radar or a similar device) the movement of each of the UAVs 110 along their respective predefined mission routes 120 in order to detect any deviations by the UAVs 110 from their predefined mission routes 120. In one aspect, the scout vehicles 155 are configured to transmit one or more signals to the computing device 150 in order to alert the computing device 150 that one or more of the UAVs 110 is about to, or has just deviated, from the mission route 120 predefined for the UAV(s) 110 by the computing device 150.

In some embodiments, after the control circuit 210 of the computing device 150 has determined and generated a suitable mission route 120 for each of the UAVs 110 and a buffer zone 125 associated with each of the UAVs 110, the control circuit 210 is programmed to generate (and cause the computing device 150 to transmit) a control signal including the predefined mission route 120 and the determined buffer zone 125 over the network 115 to each of the UAVs 110. In one aspect, when the UAVs 110 are deployed from their respective UAV deployment stations 185 along their respective mission routes 120 toward their respective delivery destinations 180, the control circuit 210 is programmed to analyze the status input acquired by the UAVs 110 in real time and transmitted to the computing device 150 over the network 115 (as will be discussed in more detail below). In some embodiments, such status input received from the UAVs 110 (which may also be received by the computing device 150 from one or more scout vehicles 155 as mentioned above) enables the control circuit 210 of the computing device 150, based on an analysis by the control circuit 210 of the received status input, to determine whether one or more of the UAVs 110 is about to deviate, or has deviated from, their predefined mission routes 120.

In some embodiments, the computing device 150 functions to monitors the movement of the UAVs 110 along their predetermined mission routes 120. For example, the control circuit 210 may be programmed to tag each UAV 110 that is in route with one or more unique characters, artifacts, color coding schemes, etc. In some implementations, such tags assist the computing device 150 in any future rerouting or dynamic rerouting of the UAVs 110, thereby providing the system 100 with further intelligence to make future corrective actions to the mission routes 120 (if necessary) without risking the overall success of the mission of the UAVs 110.

Since a deviation of a UAV 110 from its predefined mission route 120 and from its projected buffer zone 125 significantly increases the risk that the deviating UAV 110 will collide with another UAV 110 that is traveling along a predetermined mission route 120 that is proximate the predetermined fight route 120 and buffer zone 125 of the deviating UAV 110, in some embodiments, after the control circuit 210 of the computing device 150 determines that one or more UAVs 110 have deviated from their respective mission routes 120, the control circuit 210 is programmed to evaluate the projected deviation of the buffer zone 125 of the deviating UAV 110 in order to determine whether the buffer zone 125 of the deviating UAV 110 is projected to overlap a buffer zone 125 of one or more other ones of the deployed UAVs 110.

Since a projected overlap of the buffer zones 125 of two deployed UAVs 110 signals to the control circuit 210 of the computing device 150 that such UAVs 110 are on an actual (or predicted) collision course, in some implementations, the control circuit 210 is programmed to alter the mission route 120 of the UAV 110 that has deviated from its predefined mission route 120, and assign an altered mission route 170 along with an associated newly-calculated buffer zone 175 to the deviating UAV 110. The altered buffer zone 175 associated with the altered mission route 170 of the deviating UAV 110 is calculated by the control circuit 210 such that the altered buffer zone 175 of the deviating UAV 110 does not overlap the buffer zone 125 of the non-deviating UAV 110 (with which the deviating UAV 110 was initially projected by the control circuit 210 to collide with based on the buffer zones 125 overlapping). In one aspect, the control circuit 210 of the computing device 150 is programmed to alter the mission route 120 of the UAV 110 that has deviated from its predefined mission route 120 (e.g., due to a weather, air traffic, mechanical or electrical failure/malfunction, etc.) by way of causing the computing device 150 to transmit a control signal over the network 115 to the UAV 110 that deviated from the predefined mission route 120 in order to alter the mission route 120 of the deviating UAV 110.

Notably, the control circuit 210 of the computing device 150 is not programmed to always recalculate a new (i.e., altered) mission route 170 for the deviating UAV 110 in the event that a deviation from the mission route 120 by the UAV 110 is detected. For example, in some embodiments, when a projected overlap of the buffer zones 125 of two deployed UAVs 110 signals to the control circuit 210 of the computing device 150 that such UAVs 110 are on an actual (or predicted) collision course, the control circuit 210 is programmed to analyze whether to alter the mission route 120 of the deviating UAV 110 to an altered mission route 170 as discussed above, or whether to cause the UAV 110 to return to the original mission route 120 that was initially assigned to the UAV 110 for purposes of delivering the products 190 from the UAV deployment station 185 to the delivery destination 180. If the control circuit 210 determines that returning the deviating UAV 110 to its original mission route 120 is more efficient and/or safer than setting the UAV 110 to continue along the altered route 170, the control circuit 210 is programmed to instruct the deviating UAV 110 to return to the original mission route 120 that was initially assigned to the UAV 110 by way of causing the computing device 150 to transmit a control signal over the network 115 to the deviating UAV 110 in order to return the deviating UAV 110 to its originally assigned mission route 120.

In some implementations, the control circuit 210 is programmed to with learning capabilities such that any time a UAV 110 successfully goes from a UAV deployment station 185 to a delivery destination 180 along a given mission route 120, the control unit 210 may reuse this mission route 120 in the future when another UAV 110 is to deliver a product 190 from the same UAV deployment station 185 to the same delivery destination 180. For example, in one aspect, after the computing device 150 receives a notification from the UAV 110 that the UAV 110 has successfully completed travel from a UAV deployment station 185 to a delivery destination 180 (and vice versa) along a given mission route 120, the control unit 210 is programmed to transmit a notification to the electronic database 160 in order to cause the mission route 120 to be stored in the electronic database 160 in association with information that this mission route 120 has been successfully completed by a UAV 110 at least once (which may cause the control circuit 210 to be more likely to assign this mission route 120 to another UAV 110 in the future).

FIG. 3 presents a more detailed exemplary embodiment of the UAV 310 of FIG. 1. The exemplary UAV 310 has a housing 302 that contains (partially or fully) or at least supports and carries a number of components. These components include a control unit 304 comprising a control circuit 306 that, like the control circuit 210 of the computing device 150, controls the operations of the UAV 310 in some embodiments. The control unit 304 includes a memory 308 coupled to the control circuit 306 for storing data such as operating instructions and/or useful data.

In some embodiments, the control circuit 306 operably couples to a motorized leg system 309. This motorized leg system 309 functions as a locomotion system to permit the UAV 310 to land onto the ground and/or onto a landing pad at the delivery destination 180 and/or onto a rest area and/or a charging station, and/or to move laterally at the delivery destination 180, UAV deployment station 185, rest area, recharging station, or the like. Various examples of motorized leg systems are known in the art. Further elaboration in these regards is not provided here for the sake of brevity save to note that the control circuit 306 may be configured to control the various operating states of the motorized leg system 309 to thereby control when and how the motorized leg system 309 operates.

In the exemplary embodiment of FIG. 3, the control circuit 306 operably couples to at least one wireless transceiver 312 that operates according to any known wireless protocol. This wireless transceiver 312 can comprise, for example, a cellular-compatible, Wi-Fi-compatible, and/or Bluetooth-compatible transceiver that can wirelessly communicate with the computing device 150 via the network 115. So configured, the control circuit 306 of the UAV 310 can provide information (e.g., sensor input) to the computing device 150 (via the network 115) and can receive information and/or movement (e.g., routing and rerouting) instructions from the computing device 150. These teachings will accommodate using any of a wide variety of wireless technologies as desired and/or as may be appropriate in a given application setting. These teachings will also accommodate employing two or more wireless transceivers 312.

In some embodiments, the wireless transceiver 312 is configured as a two-way transceiver that can receive a signal containing instructions including the mission route 120 and/or rerouting information transmitted from the computing device 150, and that can transmit one or more signals to the computing device 150. For example, the control circuit 306 can receive a first control signal from the computing device 150 via the network 115 containing instructions regarding directional movement of the UAV 310 along a specific, central computing device-determined mission route 120 when, for example: flying from the UAV deployment station 185 to the delivery destination 180 to drop off and/or pick up a product 190, or when returning from the delivery destination 180 after dropping off or picking up a product 190 to the UAV deployment station 185. In particular, as discussed above, the computing device 150 can be configured to analyze GPS coordinates of the delivery destination 180 designated by the customer, determine a mission route 120 and an associated buffer zone 125 for the UAV 110 to the delivery destination 180, and transmit to the wireless transceiver 312 of the UAV 110 a first control signal including the mission route 120 over the network 115. The UAV 110, after receipt of the first control signal from the computing device 150, is configured to navigate along the mission route 120, based on the route instructions in the first control signal, to the delivery destination 180.

With reference to FIG. 3, the control circuit 306 of the UAV 310 also couples to one or more on-board sensors 314 of the UAV 310. These teachings will accommodate a wide variety of sensor technologies and form factors. In some embodiments, the on-board sensors 314 can comprise any relevant device that detects and/or transmits at least one status of the UAV 310 during flight of the UAV 110 along the mission route 120. The status that may be obtained by on-board sensors 314 and transmitted over the network 115 to the computing device 150 and/or electronic database 160 include but are not limited to UAV size, UAV weight, UAV speed, altitude ambient wind speed, ambient air precipitation, ambient air density, UAV electronics status, UAV communication status, UAV global positioning system (GPS) coordinates, presence of no fly zones along the predefined mission route 120, and presence of obstacles along the predefined mission routes 120. The sensors 314 of the UAV 310 can include but are not limited to: altimeter, velocimeter, thermometer, photocell, battery life sensor, video camera, radar, lidar, laser range finder, sonar, thermal camera, depth camera, 360 camera, and tactical air navigation system (TACAN). In some embodiments, the information obtained by one or more sensors 314 of the UAV 310 is used by the UAV 310 and/or the computing device 150 in functions including but not limited to: navigation, landing, object detection, potential in-air threat detection, distance measurements, topography mapping, location determination, and emergency detection.

In some aspects, the status input detected and/or transmitted by one or more sensors 314 of the UAV 310 includes but is not limited to location data associated with the UAV 310. Such location data can include, for example GPS coordinates of the UAV 310, marker beacon data along the mission route 120, and way point data along the mission route 120, all of which enable the control circuit 210 of the computing device 150 and/or the control circuit 306 of the UAV 310, based on an analysis of at least such location data, to predict whether the UAV 310 is likely to continue along the predefined mission route 120 or to be deviated from it.

In some embodiments, the status input detected and/or transmitted by the at least one sensor 314 of the UAV 310 includes UAV status data including but not limited to propeller status, electronics status, communication status, interfering radio frequency (RF) status. For example, the UAV 310 can include at least one sensor 314 configured to monitor the function of, and to detect any malfunction of, any mechanical or electronic component of the UAV 310. In some embodiments, the sensors 314 of the UAV 310 are configured to, for example, detect rotation speed of the propellers of the UAV 310, detect directional movement of the UAV 310, measure ambient temperature surrounding the UAV 310, capture images and/or video in the air around the UAV 310 or on the ground below the UAV 310 along the mission route 120 of the UAV 310, capture thermographic, infrared, and/or multi spectral images of such in-air or on ground objects, capture images of entities attempting to tamper with UAV 310. Such sensors 314 include but are not limited to one or more accelerometers, gyroscopes, odometers, location sensors, microphones, distance measurement sensors (e.g., laser sensors, sonar sensors, sensors that measure distance by emitting and capturing a wireless signal (which can comprise light and/or sound) or the like), 3D scanning sensors, other such sensors, or a combination of two or more of such sensors.

In some embodiments, the status input detected and/or transmitted by the at least one sensor 314 of the UAV 310 includes flight mission data of the UAV 310. Such flight mission data can include but is not limited to: dimensional characteristics of the product(s) 190 being transported by the UAV 310; weight of the product(s) 190 being transported by the UAV 310; total weight of the UAV 310; component configuration of the UAV 310; altitude of the UAV 310; speed of the UAV 310; ambient wind speed; ambient temperature; ambient light level, in-air objects proximate the UAV 310 along the mission route 120; distance of the UAV 310 to the in-air objects; angle of incidence of the UAV 310 relative to the in-air objects; remaining battery life of the UAV 310; start- and end-points of the UAV 310 along the mission route 120; original path of the UAV 310 along the mission route 120; location of one or more mobile relay stations along the mission route 120; location of at least one facility of the retailer having a safe landing point along the mission route 120; total dollar value of the products 190 being transported by the UAV 310; and total dollar value of the UAV 310.

For example, in some aspects, the sensors 314 include one or more devices that can be used to capture data related to one or more in-air objects (e.g., other UAVs 310, helicopters, birds, rocks, etc.) located within a threshold distance relative to the UAV 310. For example, the UAV 310 includes at least one on-board sensor 314 configured to detect at least one obstacle between the UAV 310 and the delivery destination 180 designated by the customer. Based on the detection of one or more obstacles by such a sensor 314, the UAV 310 is configured to avoid the obstacle(s). In some embodiments, the UAV 310 may attempt to avoid detected obstacles, and if unable to avoid, to notify the computing device 150 of such a condition. In some embodiments, using on-board sensors 314 (such as distance measurement units, e.g., laser or other optical-based distance measurement sensors), the UAV 310 detects obstacles in its path, and flies around such obstacles or stops until the obstacle is clear.

In some embodiments, the UAV 310 includes an on-board sensor 314 (e.g., a video camera) configured to detect map reference and/or topography and/or objects along a pre-defined mission route 120. For example, in some aspects, one or more map reference or topography data acquired by one or more sensors 314 of the UAV 310 includes but is not limited to: no fly zones along the mission route 120, known safe stops and/or recharging stations along the mission route 120, on-the-ground people, buildings, vehicles and/or other objects, as well as hills, bodies of water, power lines, roads, and other environmental factors along the mission route 120. In some embodiments, the sensors 314 of the UAV 310 are configured to transmit (e.g., via internal circuitry and/or via the transceiver 312) still and/or moving images of the space surrounding the UAV 310, which allows the control circuit 306 of the UAV 310 and/or the control circuit 210 of the computing device 150 to analyze the detected environmental elements and assess if the UAV 310 has deviated and/or is about to unavoidably deviate from its predefined mission route 120.

In some embodiments, an audio input 316 (such as a microphone) and/or an audio output 318 (such as a speaker) can also operably couple to the control circuit 306 of the UAV 310. So configured, the control circuit 306 can provide for a variety of audible sounds to enable the UAV 310 to communicate with, for example, the computing device 150 or other UAVs and/or other aircraft along the mission route 120, or electronic devices at the delivery destination 180. Such sounds can include any of a variety of tones and/or sirens and/or other non-verbal sounds. Such audible sounds can also include, in lieu of the foregoing or in combination therewith, pre-recorded or synthesized speech.

In the embodiment illustrated in FIG. 3, the UAV 310 includes a rechargeable power source 320 such as one or more batteries. The power provided by the rechargeable power source 320 can be made available to whichever components of the UAV 310 require electrical energy. By one approach, the UAV 310 includes a plug or other electrically conductive interface that the control circuit 306 can utilize to automatically connect to an external source of electrical energy (e.g., a charging dock) to recharge the rechargeable power source 320.

In some embodiments, the UAV 310 includes an input/output (I/O) device 330 that is coupled to the control circuit 306. The I/O device 330 allows an external device to couple to the control unit 304. The function and purpose of connecting devices will depend on the application. In some examples, devices connecting to the I/O device 330 may add functionality to the control unit 304, allow the exporting of data from the control unit 304, allow the diagnosing of the UAV 310, and so on.

In some embodiments, the UAV 310 includes a user interface 324 including for example, user inputs and/or user outputs or displays depending on the intended interaction with the user (e.g., a worker of a retailer or UAV delivery service or customer). For example, user inputs could include any input device such as buttons, knobs, switches, touch sensitive surfaces or display screens, and so on. Example user outputs include lights, display screens, and so on. The user interface 324 may work together with or separate from any user interface implemented at an optional user interface unit (such as a smart phone or tablet device) usable by the worker.

In some embodiments, the UAV 310 may be controlled by a user in direct proximity to the UAV 310, for example, an operator of the UAV deployment station 185 (e.g., a driver of a moving vehicle), or by a user at any location remote to the location of the UAV 310 (e.g., regional or central hub operator). This is due to the architecture of some embodiments where the computing device 150 outputs control signals to the UAV 310. These controls signals can originate at any electronic device in communication with the computing device 150. For example, the signals sent to the UAV 310 may be movement instructions determined by the computing device 150 and/or initially transmitted by a device of a user to the computing device 150 and in turn transmitted from the computing device 150 to the UAV 310.

The control unit 304 of the UAV 310 includes a memory 308 coupled to a control circuit 306 and storing data such as operating instructions and/or other data. The control circuit 306 can comprise a fixed-purpose hard-wired platform or can comprise a partially or wholly programmable platform. These architectural options are well known and understood in the art and require no further description. This control circuit 306 is configured (e.g., by using corresponding programming stored in the memory 308 as will be well understood by those skilled in the art) to carry out one or more of the steps, actions, and/or functions described herein. The memory 308 may be integral to the control circuit 306 or can be physically discrete (in whole or in part) from the control circuit 306 as desired. This memory 308 can also be local with respect to the control circuit 306 (where, for example, both share a common circuit board, chassis, power supply, and/or housing) or can be partially or wholly remote with respect to the control circuit 306. This memory 308 can serve, for example, to non-transitorily store the computer instructions that, when executed by the control circuit 306, cause the control circuit 306 to behave as described herein. It is noted that not all components illustrated in FIG. 3 are included in all embodiments of the UAV 310. That is, some components may be optional depending on the implementation.

In some aspects, the UAV 310 includes sensors 314 configured to recognize in-air and environmental elements along the mission route 120 of the UAV 310 toward and/or away from the delivery destination 180. Such sensors 314 can provide information that the control circuit 306 of the UAV 310 and/or the control circuit 210 of the computing device 150 can employ to determine a present location, distance, and/or orientation of the UAV 310 relative to one or more in-air objects along the mission route 120 and/or relative to the predefined mission route 120 itself, and determine whether the UAV 310 has deviated, or is about to unavoidably deviate from, the predefined mission route 120. These teachings will accommodate any of a variety of distance measurement units including optical units and sound/ultrasound units. In one example, a sensor 314 comprises an altimeter and/or a laser distance sensor device capable of determining a distance to objects in proximity to the sensor 314. In some embodiments, such information may be processed by the control circuit 306 of the UAV 310 and/or the control circuit 210 of the computing device 150 in order to determine, for example, whether the UAV 310 is continuing its flight along the originally determined mission route 120, or whether the UAV 310 is about to or has already deviated from the predefined mission route 120 such the projected buffer zone 125 originally calculated for the mission route of the UAV 110 is already or is about to overlap a buffer zone of another nearby UAV 110 flying along its mission route.

In some aspects, after the control circuit 306 of the UAV 310 and/or the control circuit 210 of the computing device 150 determines, based on received sensor input from the UAV 310, that the UAV 310 has deviated from the predefined mission route 120 such the projected buffer zone 125 originally calculated for the mission route of the UAV 110 is about to or already overlaps a buffer zone of another nearby UAV 110 flying along its mission route, the control circuit 306 of the deviating UAV 310 is programmed to evaluate the deviation of the buffer zone 125 of the UAV 310, and generate an altered mission route 170 and an associated recalculated buffer zone 175 for the deviating UAV 310 such that, while the deviating UAV 310 is rerouted and is flying along the altered mission route 170, the buffer zone 175 of the deviating UAV 310 no longer overlaps the buffer zone of the UAV with which the deviating UAV 310 was projected to collide, and does not overlap the buffer zone of any other UAVs that are flying in proximity to the altered mission route 170 of the deviating UAV 310.

In certain implementations, if the control circuit 306 of the deviating UAV 310 is unable to correct the deviation of the UAV 310 from the predefined mission route 120 (e.g., due to a mechanical failure of the UAV 310, electrical failure of the UAV 310, or the like), the control circuit 210 of the computing device 150 acts as a back-up UAV re-router to correct the situation caused by the deviating UAV 310. In particular, in some aspects, after a predetermined time interval (e.g., 5 seconds, 10 seconds, 15 seconds, 30 seconds, 1 minute, 2 minutes, 3 minutes, etc.) during which a deviation of the UAV 310 from the predefined mission route 120 has not been corrected by the control circuit 306 of the deviating UAV 310, the control circuit 210 of the computing device 150 is programmed to evaluate the deviation of the buffer zone 125 of the UAV 310, and generate an altered mission route 170 and an associated recalculated buffer zone 175 for the deviating UAV 310 such that, while the deviating UAV 310 is rerouted and is flying along the altered mission route 170, the buffer zone 175 of the deviating UAV 310 no longer overlaps the buffer zone of the UAV with which the deviating UAV 310 was projected to collide, and does not overlap the buffer zone of any other UAVs that are flying in proximity to the altered mission route 170 of the deviating UAV 310.

In some aspects, after the control circuit 306 of the UAV 310 and/or the control circuit 210 of the computing device 150 determines, based on received sensor input from the UAV 310, that the UAV 310 has deviated from the predefined mission route 120 such the projected buffer zone 125 originally calculated for the mission route of the UAV 110 is about to or already overlaps a buffer zone of another nearby UAV 110 flying along its mission route, the control circuit 306 of the deviating UAV 310 is programmed to alter the mission route 120 of the non-deviating UAV 310 instead of altering the mission route 120 of the deviating UAV 310 as mentioned above. For example, in one aspect, the control circuit 306 of the deviating UAV 310, based on an analysis of the deviation of the buffer zone 125 of the deviating UAV 310 and based on the original mission route 120 and buffer zone 125 of the non-deviating UAV 310, generates an altered mission route 170 and an associated recalculated buffer zone 175 for the non-deviating UAV 310 such that, while the non-deviating UAV 310 is rerouted and is flying along the altered mission route 170, the buffer zone 175 of the non-deviating UAV 310 no longer overlaps the buffer zone of the deviating UAV 310 or the buffer zone of any other UAVs that are flying in proximity to the altered mission route 170 of the non-deviating UAV 310. In one aspect, the control circuit 306 of the deviating UAV 310 generates and causes the UAV 310 to transmit, to the non-deviating UAV 310, a control signal including an altered mission route 170 for the non-deviating UAV 310, which causes the non-deviating UAV 310 to adopt the altered mission route 170 and avoid a collision with the deviating UAV 310.

FIG. 4 shows an embodiment of an exemplary method 400 of creating and monitoring predefined mission routes 120 and buffer zones 125 for UAVs 110 during travel of the UAVs 110 along the predefined mission routes 120. The embodiment of the method 400 illustrated in FIG. 4 includes providing a plurality of UAVs 110 configured to transport commercial retail products 190 and/or goods not for sale along predefined mission routes 120, and including a processor-based control circuit 306 and at least one sensor 314 configured to detect and transmit over a network 115 at least one status input associated with the UAV 110 during movement along the predefined mission route 120 (step 410). The exemplary method 400 further includes providing a computing device 150 including a processor-based control circuit 210 and being in communication with each of the UAVs 110 over the network 115 (step 420).

As discussed above, the computing device 150 is configured to obtain and analyze the relative locations of the UAV deployment station 185 and delivery destination 180 in order to determine a mission route 120 and a buffer zone 125 for the UAV 110 with respect to the travel of the UAV 110 from the UAV deployment station 185 to the delivery destination 180. For example, as discussed above, in some embodiments, the computing device 150 obtains GPS data associated with the delivery destination 180 from the customer information database 140 and GPS data associated with the UAV deployment station 185 from the electronic database 160.

After the GPS coordinates of the UAV deployment station 185 and the delivery destination 180 are obtained by the computing device 150, the exemplary method 400 of FIG. 4 includes determining, via the computing device 150, the predefined mission route 120 for each of the UAVs 110 to deliver the products 190 to their respective delivery destinations 180 (step 430). In addition to determining a predefined mission route 120 for the UAV 110, the exemplary method 400 includes analyzing, via the computing device 150 and prior to deployment of the UAVs 110, the predefined mission route 120 for each of the UAVs 110 in order to determine a buffer zone 125 surrounding each of the UAVs 110 such that the buffer zones 125 of the UAVs 110 are non-overlapping to avoid projected collisions of the UAVs (step 440).

After the mission route 120 of the UAV 110 from the UAV deployment station 185 to the delivery destination 180 is determined by the computing device 150, the exemplary method 400 further includes transmitting, via the computing device 150, a control signal including the predefined mission route 120 and the determined buffer zone 125 over the network 115 to each of the UAVs 110 (step 450). As discussed above, it will be appreciated that the route instructions, after being determined by the computing device 150, can be recalculated by the control circuit 210 of the computing device 150 (or the control circuit 306 of the UAV 110) in real-time, for example, if an obstacle, no-fly zone, mechanical or electrical malfunction, or another condition altering movement of the UAV 110 enough to cause the UAV 110 to deviate from its predefined mission route 120, is detected along the originally calculated mission route 120 of the UAV 110.

As discussed above, the on-board sensors 314 of the UAV 310 may include but are not limited to: altimeter, velocimeter, thermometer, photocell, battery life sensor, video camera, radar, lidar, laser range finder, sonar, thermal camera, depth camera, 360 camera, and TACAN, and the information obtained by the sensors 314 of the UAV 310 while the UAV 310 is in flight is used by the UAV 310 and/or the computing device 150 in functions including but not limited to: navigation, landing, object detection, potential in-air threat detection, distance measurements, topography mapping, location determination, and emergency detection. In some aspects, the status input detected and/or transmitted by the sensors 314 of the UAV 310 includes but is not limited to location data associated with the UAV 310 and data relating to potential obstacles, in-air objects, and UAV status information that may be relevant to analysis, by the control circuit 306 of the UAV 310, of potential emergency conditions that may force the UAV 310 to deviate from the predefined mission route 120.

As discussed above, in some embodiments, the control circuit 306 of the UAV 310 analyzes one or more status inputs obtained by one or more sensors 314 while the UAV 110 is in normal flight mode and/or facing and/or undergoing a condition that results in the deviation of the UAV 110 from the predetermined mission route 120. To that end, the method 400 includes analyzing, via the control circuit 306 of each of the UAVs 110, the status input obtained by one or more sensors 314 while the UAVs 110 are deployed along their predefined mission routes 120 in order to determine whether at least one of the UAVs 110 deviated from their predefined mission routes 120 (step 460).

In some aspects, after the control circuit 306 of the UAV 310 and/or the control circuit 210 of the computing device 150 determines, based on received sensor input from the UAV 310, that the UAV 310 has deviated from the predefined mission route 120, the exemplary method 400 further includes evaluating, via the control circuit 306 of each of the UAVs 110, a projected deviation of the buffer zone 125 of the UAV 110 that deviated from the predefined mission route 120 in order to determine whether the buffer zone 125 of the UAV 110 that deviated from the predefined mission route 120 is projected to overlap a buffer zone 125 of at least one other one of the UAVs (step 470). As described above, after the control circuit 306 of the UAV 310 and/or the control circuit 210 of the computing device 150 determines, based on received sensor input from the UAV 310, that the UAV 310 has deviated from the predefined mission route 120 such the projected buffer zone 125 originally calculated for the mission route of the UAV 110 is about to or already overlaps a buffer zone of another nearby UAV 110 flying along its mission route, the method 400 further includes altering, via the control circuit 306 of each of the UAV 110, the mission route 120 of the UAV 110 that deviated from the predefined mission route 120 such that the buffer zones 125 of the UAV 110 that deviated from the predefined mission route 120 and the buffer zones of other deployed UAVs are projected to no longer overlap each other (step 480).

The systems and methods described herein advantageously facilitate travel of unmanned aerial vehicles along delivery routes that have calculated safety buffers designed to reduce the chances of in-air collisions between the unmanned aerial vehicles as they are traveling along their predefined mission routes. As such, the systems and methods described herein provide a significant cost and likely liability savings to operators of unmanned aerial vehicles when performing deliveries of products to customers via unmanned aerial vehicles.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for creating and monitoring predefined mission routes and buffer zones for unmanned vehicles during travel of the unmanned vehicles along the predefined mission routes, the system comprising:
a plurality of unmanned vehicles each including a processor-based control circuit and configured to transport commercial retail products and goods not for sale along predefined mission routes, each of the unmanned vehicles including at least one sensor configured to detect and transmit over a network at least one status input associated with the unmanned vehicle during movement along the predefined mission route;
a computing device including a processor-based control unit and being in communication with each of the unmanned vehicles over the network, the computing device being configured to:
  determine the predefined mission route for each of the unmanned vehicles to deliver the products to their respective delivery destinations;
  analyze, prior to deployment of the unmanned vehicles, the predefined mission route for each of the unmanned vehicles in order to determine a buffer zone surrounding each of the unmanned vehicles, the buffer zones of the unmanned vehicles being non-overlapping to avoid projected collisions of the unmanned vehicles;

transmit a control signal including the predefined mission route and the determined buffer zone over the network to each of the unmanned vehicles;

wherein the control circuit of each of the unmanned vehicles is configured to:

analyze the at least one status input while the unmanned vehicles are deployed along their predefined mission routes to determine whether at least one of the unmanned vehicles deviated from their predefined mission routes;

evaluate a projected deviation of the buffer zone of the at least one of the unmanned vehicles that deviated from the predefined mission route in order to determine whether the buffer zone of the at least one of the unmanned vehicles that deviated from the predefined mission route is projected to overlap a buffer zone of at least one other one of the unmanned vehicles; and alter the mission route of the at least one of the unmanned vehicles that deviated from the predefined mission route such that the buffer zones of the at least one of the unmanned vehicles that deviated from the predefined mission route and the at least one other one of the unmanned vehicles are projected to no longer overlap each other; and at least one scout vehicle configured to analyze, prior to the deployment of the unmanned vehicles, travel conditions along the predefined mission route for each of the unmanned vehicles and transmit at least one signal over the network to the computing device, the signal including the travel conditions analyzed by the at least one scout vehicle, the computing device being configured to determine the buffer zone for each of the unmanned vehicles based at least in part on the signal received from the at least one scout vehicle.

2. The system of claim 1, wherein the at least one status input comprises at least one of: unmanned vehicle size, unmanned vehicle weight, unmanned vehicle speed, unmanned vehicle altitude, ambient wind speed, ambient air precipitation, ambient air density, unmanned vehicle electronics status, unmanned vehicle communication status, unmanned vehicle global positioning system (GPS) coordinates, presence of no fly zones along the predefined mission route, and presence of obstacles along the predefined mission route.

3. The system of claim 1, wherein the at least one sensor comprises an altimeter, velocimeter, thermometer, photocell, battery life sensor, camera, radar, lidar, laser range finder, and sonar.

4. The system of claim 1, wherein, after a predetermined time interval during which a deviation of the at least one of the unmanned vehicles from the predefined mission route has not been corrected by the control circuit of the at least one of the unmanned vehicles, the computing device is configured to:

evaluate a projected deviation of the buffer zone of the at least one of the unmanned vehicles that deviated from the predefined mission route in order to determine whether the buffer zone of the at least one of the unmanned vehicles that deviated from the predefined mission route is projected to overlap a buffer zone of at least one other one of the unmanned vehicles; and alter the mission route of the at least one of the unmanned vehicles that deviated from the predefined mission route such that the buffer zones of the at least one of the unmanned vehicles that deviated from the predefined mission route and the at least one other one of the unmanned vehicles are projected to no longer overlap each other.

5. The system of claim 1, wherein the computing device is programmed to transmit a control signal over the network to the at least one of the unmanned vehicles that deviated from the predefined mission route in order to alter the mission route of the at least one of the unmanned vehicles that deviated from the predefined mission route.

6. The system of claim 1, wherein the buffer zone determined by the computing device is a three-dimensional buffer zone.

7. The system of claim 1, wherein the at least one scout vehicle is further configured to:

analyze, after the deployment of the unmanned vehicles, the travel conditions along the predefined mission route for each of the unmanned vehicles; and transmit at least one signal over the network to at least one of the computing device and the unmanned vehicles.

8. The system of claim 1, wherein the control circuit of the at least one of the unmanned vehicles that deviated from the predefined mission route is programmed to alter the mission route of the at least one other one of the unmanned vehicles instead of altering the mission route of the at least one of the unmanned vehicles that deviated from the predefined mission route.

9. The system of claim 8, wherein the control circuit of the at least one of the unmanned vehicles that deviated from the predefined mission route is programmed to transmit a control signal over the network to the at least one other one of the unmanned vehicles, the control signal including an altered mission route for the at least one other one of the unmanned vehicles.

10. A method for creating and monitoring predefined mission routes and buffer zones for unmanned vehicles during travel of the unmanned vehicles along the predefined mission routes, the method comprising:

providing a plurality of unmanned vehicles each including a processor-based control circuit and configured to transport commercial retail products and goods not for sale along predefined mission routes, each of the unmanned vehicles including at least one sensor configured to detect and transmit over a network at least one status input associated with the unmanned vehicle during movement along the predefined mission route;

providing a computing device including a processor-based control unit and being in communication with each of the unmanned vehicles over the network;

determining, via the computing device, the predefined mission route for each of the unmanned vehicles to deliver the products to their respective delivery destinations;

analyzing, via the computing device and prior to deployment of the unmanned vehicles, the predefined mission route for each of the unmanned vehicles in order to determine a buffer zone surrounding each of the unmanned vehicles, the buffer zones of the unmanned vehicles being non-overlapping to avoid projected collisions of the unmanned vehicles;

transmitting, via the computing device, a control signal including the predefined mission route and the determined buffer zone over the network to each of the unmanned vehicles;

analyzing, via the control circuit of each of the unmanned vehicles, the at least one status input while the unmanned vehicles are deployed along their predefined mission routes to determine whether at least one of the unmanned vehicles deviated from their predefined mission routes;

evaluating, via the control circuit of each of the unmanned vehicles, a projected deviation of the buffer zone of the at least one of the unmanned vehicles that deviated from the predefined mission route in order to determine whether the buffer zone of the at least one of the unmanned vehicles that deviated from the predefined mission route is projected to overlap a buffer zone of at least one other one of the unmanned vehicles;

altering, via the control circuit of each of the unmanned vehicles, the mission route of the at least one of the unmanned vehicles that deviated from the predefined mission route such that the buffer zones of the at least one of the unmanned vehicles that deviated from the predefined mission route and the at least one other one of the unmanned vehicles are projected to no longer overlap each other;

providing at least one scout vehicle:

analyzing, via the at least one scout vehicle and prior to the deployment of the unmanned vehicles, travel conditions along the predefined mission route for each of the unmanned vehicles; and transmitting a signal, via the at least one scout vehicle and over the network to the computing device, the signal including the travel conditions analyzed by the at least one scout vehicle, the computing device being configured to determine the buffer zone for each of the unmanned vehicles based at least in part on the signal received from the at least one scout vehicle.

11. The method of claim 10, wherein the at least one status input comprises at least one of: unmanned vehicle size, unmanned vehicle weight, unmanned vehicle speed, unmanned vehicle altitude, ambient wind speed, ambient air precipitation, ambient air density, unmanned vehicle electronics status, unmanned vehicle communication status, unmanned vehicle global positioning system (GPS) coordinates, presence of no fly zones along the predefined mission route, and presence of obstacles along the predefined mission route.

12. The method of claim 10, wherein the at least one sensor comprises an altimeter, velocimeter, thermometer, photocell, battery life sensor, camera, radar, lidar, laser range finder, and sonar.

13. The method of claim 10, wherein, after a predetermined time interval during which a deviation of the at least one of the unmanned vehicles from the predefined mission route has not been corrected by the control circuit of the at least one of the unmanned vehicles:

evaluating, via the computing device, a projected deviation of the buffer zone of the at least one of the unmanned vehicles that deviated from the predefined mission route in order to determine whether the buffer zone of the at least one of the unmanned vehicles that deviated from the predefined mission route is projected to overlap a buffer zone of at least one other one of the unmanned vehicles; and altering, via the computing device, the mission route of the at least one of the unmanned vehicles that deviated from the predefined mission route such that the buffer zones of the at least one of the unmanned vehicles that deviated from the predefined mission route and the at least one other one of the unmanned vehicles are projected to no longer overlap each other.

14. The method of claim 10, further comprising transmitting, via the computing device, a control signal over the network to the at least one of the unmanned vehicles that deviated from the predefined mission route in order to alter the mission route of the at least one of the unmanned vehicles that deviated from the predefined mission route.

15. The method of claim 10, wherein the buffer zone determined by the computing device is a three-dimensional buffer zone.

16. The method of claim 10, further comprising:

analyzing, via the at least one scout vehicle and after the deployment of the unmanned vehicles, the travel conditions along the predefined mission route for each of the unmanned vehicles; and transmitting, via the at least one scout vehicle, at least one signal over the network to at least one of the computing device and the unmanned vehicles.

17. The method of claim 10, further comprising altering, via the control circuit of the at least one of the unmanned vehicles that deviated from the predefined mission route, the mission route of the at least one other one of the unmanned vehicles instead of altering the mission route of the at least one of the unmanned vehicles that deviated from the predefined mission route.

18. The method of claim 17, transmitting, via the control circuit of the at least one of the unmanned vehicles that deviated from the predefined mission route, a control signal over the network to the at least one other one of the unmanned vehicles, the control signal including an altered mission route for the at least one other one of the unmanned vehicles.

* * * * *